March 3, 1964 S. B. TIBBLING 3,122,931
PROGRAMMED INDEXING MECHANISM
Filed April 6, 1961 3 Sheets-Sheet 1
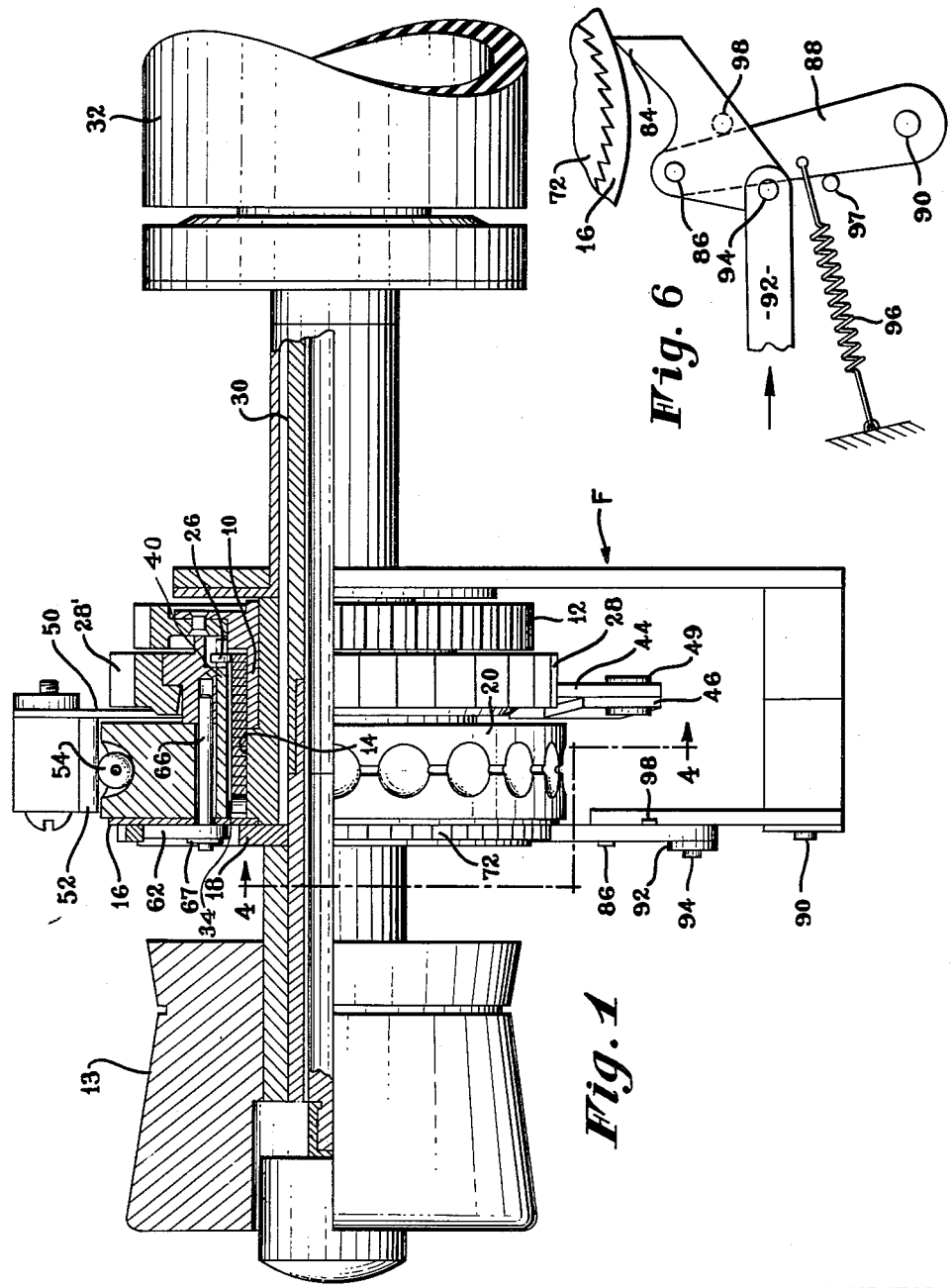
INVENTOR
STIG TIBBLING
BY Watson, Cole, Grindle & Watson
ATTORNEYS

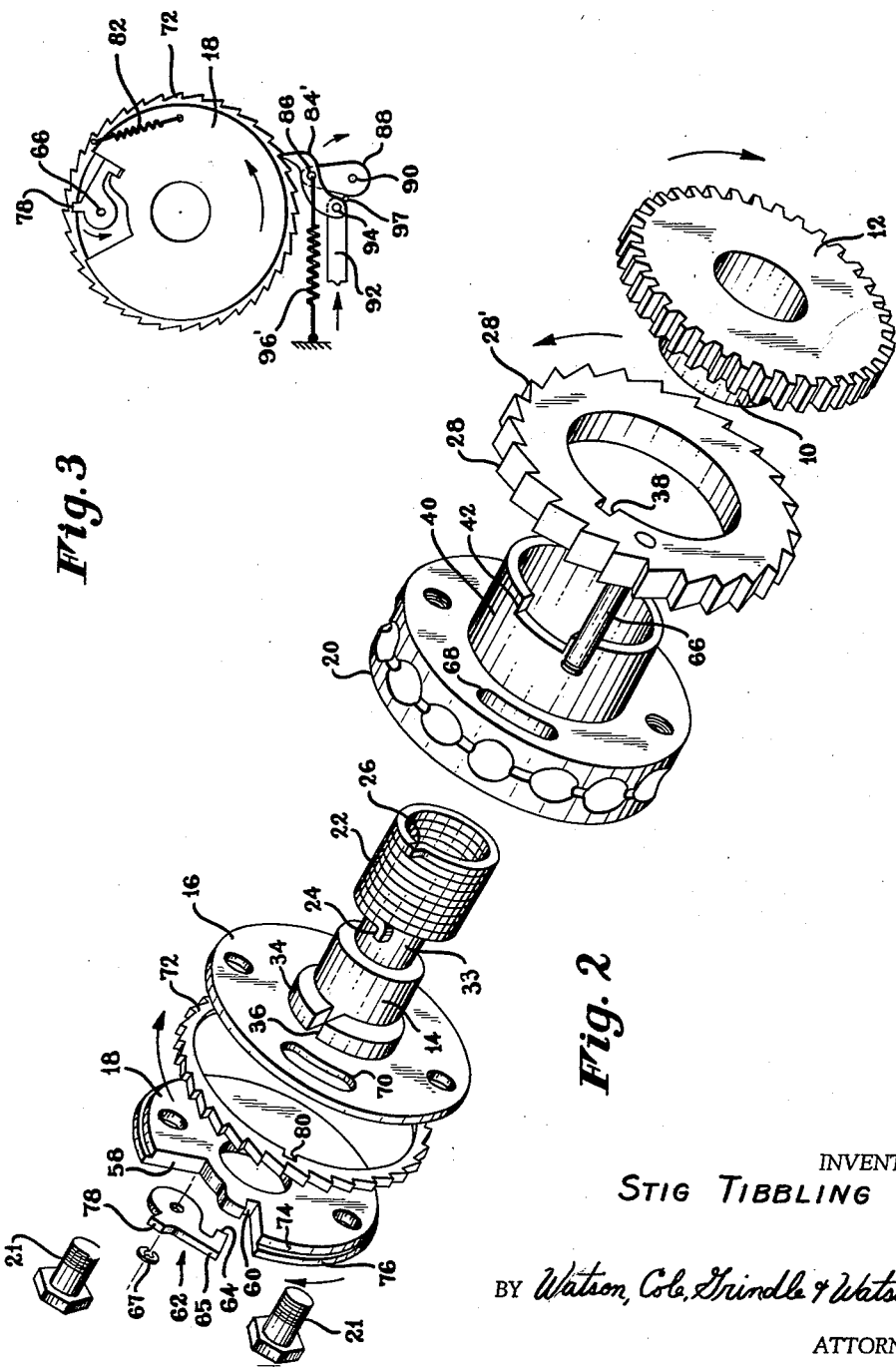

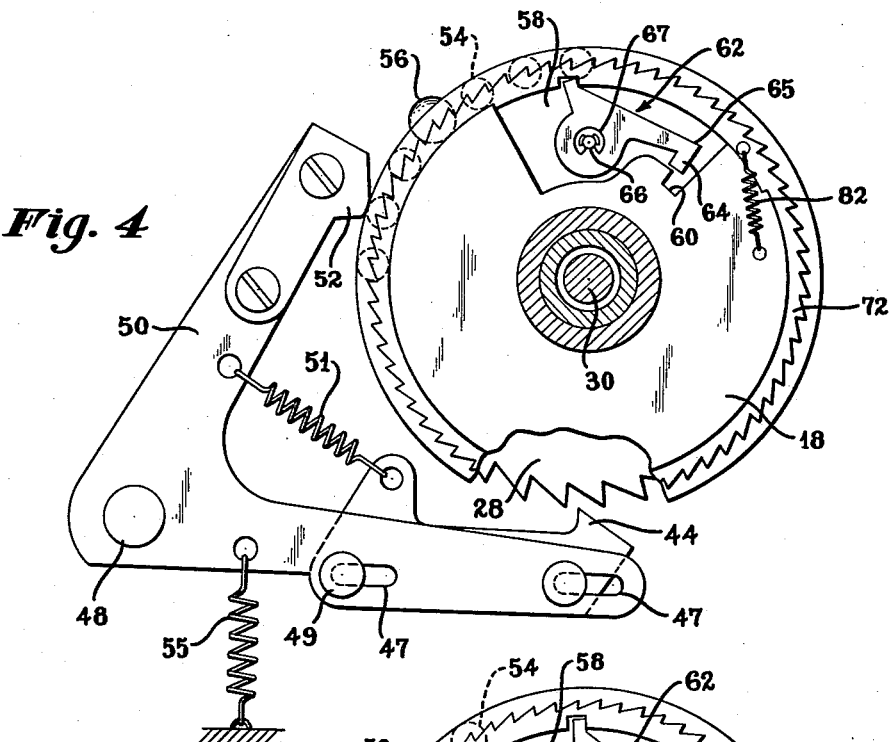
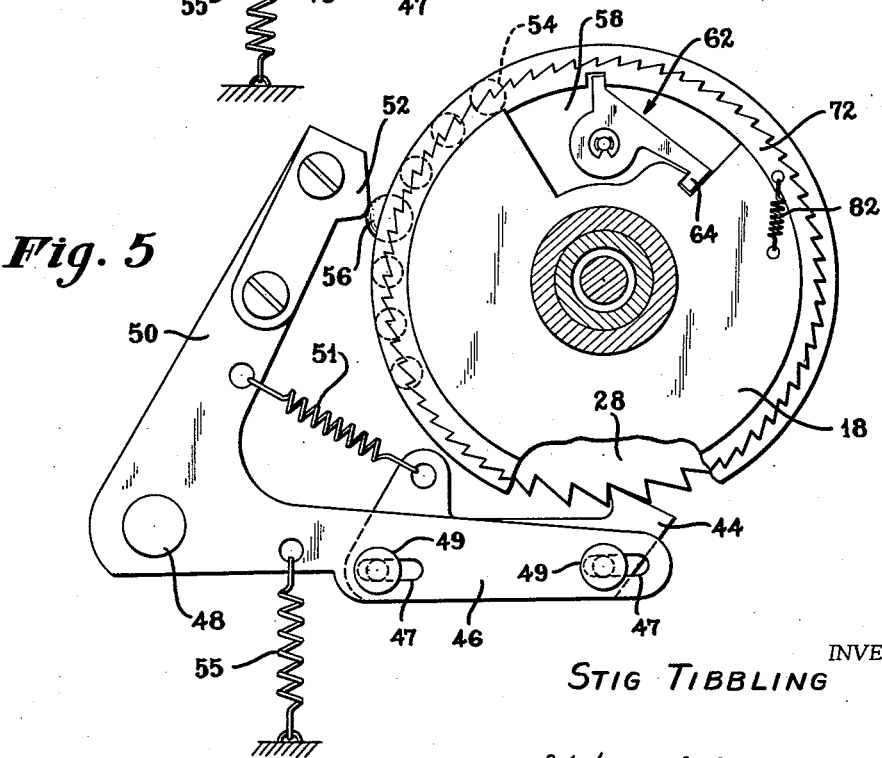

United States Patent Office 3,122,931
Patented Mar. 3, 1964

3,122,931
PROGRAMMED INDEXING MECHANISM
Stig B. Tibbling, Hollywood, Fla., assignor to Kidder Press Company, Inc., Dover, N.H., a corporation of Delaware
Filed Apr. 6, 1961, Ser. No. 101,288
19 Claims. (Cl. 74—125.5)

This invention relates to a programmed indexing mechanism such as is particularly adapted for use as a line finder mechanism for a typewriter to automatically skip feed the typewriter platen to a series of successive predetermined positions, as is desired for instance in filling out forms. However, the mechanism of the invention, and various of its novel components are capable of a wide variety of more general uses.

Various manually actuated line finder mechanisms have heretofore been devised for indexing the typewriter roller platen from one predetermined position to the next to bring the desired lines of a form into proper position. Such a device is exemplified for instance in the U.S. Patent No. 2,887,206, to Louis F. Hageman, granted May 19, 1959.

It is an important feature of the present invention to provide a mechanism for this same general purpose, but which is power driven, the arrangement being such that as soon as a given line or lines are filled out, the device may be actuated at the will of the operator to cause it to be skip fed by power to bring the rotary platen and the paper thereon into accurate position at the next predetermined line or location at which further typing is required.

The mechanism of the invention comprises essentially a novel arrangement of spring clutch having a driving assembly which is constantly power driven, for instance from an electric motor, in conjunction with a driven assembly in driving connection with the typewriter platen, together with a rotary primary control element connected to the clutch spring for engaging or disengaging it. In conjunction with such a clutch structure, it is a highly important feature of the invention to provide a latch mechanism operative by the momentum of the driven clutch assembly to maintain the driving and driven assemblies completely disengaged until positive action is taken to reengage them for a further indexing operation.

A further important feature of the invention consists in that the clutch mechanism utilizes separate and relatively spaced engagement and disengagement control elements, thereby permitting great flexibility of application. Also, an important novel feature associated with the latching mechanism consists in a secondary control element which performs the dual functions of controlling the disengagement of the latch mechanism and actuating a primary control element to positively reengage the clutch.

It is a further feature of the invention to mount the primary control element on the driven assembly for rotation therewith and for angular control movement relative to said assembly, all in such manner that the primary control element will be completely free of engagement with the driving parts, so that the constantly rotating driving assembly will not exert a drag tending to inadvertently reengage the clutch after it has been disengaged.

A most important object of the invention is to so arrange the clutch as to permit manual indexing, independently of and without disturbing the setting or subsequent operation of the automatic programming control mechanism. Included in the means for attaining this object is a novel combination of a control lever structure having a follower in operative engagement with the programming control cam element, in conjunction with a stop pawl, also carried by the control to engage and arrest the rotation of the primary control element under the control of the said programming cam element, the pawl however being resiliently yieldable with the primary control element for part of its rotary movement, both to cushion the rotation arresting action and then to return the element accurately to its preselected position of rotation. This same arrangement also permits yielding of the pawl incident to manual indexing to an extent sufficient to permit the actuating cam lobe to ride from beneath the control lever follower, thereby permitting retraction of the pawl before it has reached the limit of its yielding movement.

The invention particularly encompasses the clutch structure, per se, as a new and useful mechanism capable of a wide variety of applications, in addition to its specific application as part of a line finder mechanism.

A specific embodiment of the invention is illustrated in the accompanying drawings in its preferred adaptation for use as programmed indexing or line finding mechanism for a typewriter. Thus in the accompanying drawings:

FIGURE 1 represents a fragmentary view of the left hand end of a usual typewriter roller platen and shaft having the invention applied thereto as an automatic line finder, including programmed indexing means.

FIGURE 2 is an exploded diagrammatic perspective view of the spring clutch mechanism together with its programmed indexing mechanism and controls.

FIGURE 3 is a diagrammatic view of the latch means and a slightly modified form of its associated starting ratchet as employed in the clutch mechanism.

FIGURE 4 is a comparatively enlarged view, partly in elevation and partly in section, on the line 4—4 of FIGURE 1, showing the manner in which the programming cam element acts through the control lever to actuate the stop pawl and the primary control element.

FIGURE 5 is a view similar to FIGURE 4, but with the stop pawl operatively engaged with the primary control element and the latch means actuated to secure the clutch elements in disengaged condition.

FIGURE 6 is an enlarged fragmentary view of the starting pawl together with its mounting and actuating means in conjunction with the starting ratchet or secondary control element.

Referring now in detail to the accompanying drawings, the invention embodies a novel clutch mechanism, of which the driving assembly includes a rotary friction drum or hub 10 having affixed coaxially thereto suitable means, such as the spur gear 12, for transmitting constant rotation to the hub 10 from any suitable source of power. The driven assembly is exemplified by the several interconnected parts, including the driven friction drum or hub 14 with its radial flange or mounting plate 16, the latch element or retaining plate 18, and the programming cam element or wheel 20. The several elements 16, 18 and 20 are fixedly interconnected, as by means of bolts 21, for movement with the driven drum 14 and with each other. In accordance with usual practice in spring clutch structures, the drive is imparted from the driving drum 10 to the driven drum 14 by means of a helical clutch spring 22 which is generally coextensive with and surrounds both of the drums 14 and 10 in operative relationship thereto. One end 24 of the spring is anchored to the driven assembly for rotation therewith, while the other or free end 26 of the spring is connected to a primary control element, exemplified in the present instance by the annular ratchet element or wheel 28 which is coaxially supported on the clutch structure for angular control movement with respect to the anchored end 24 of the spring. Thereby angular movement of this control element 28 with respect to the driven assembly will tighten or loosen the spring and thereby engage or disengage it from its associated drums.

The foregoing relationship between the driving and driven drums, the clutch 22 and the control element 28, as thus far described, is generally conventional. It will be seen that the clutch spring is wound in such a direction that when twisted tight to bring it into operative engagement with the driving and driven drums 10 and 14, respectively, the rotation of the driving drum 10 in a clockwise direction as seen in FIGURE 2, and the torque imposed on the spring by the resulting load, will tend to tighten the spring still further and increase its frictional engagement with both drums.

Now considering more specifically the several elements and their organization, the several clutch elements are adapted for mounting on and imparting an intermittent indexing drive to the rotatably supported shaft 30 of the roller platen 32 of a typewriter. In the preferred form of the invention the typewriter may be of the electrically driven type having its own motor for imparting drive to the driving assembly through any suitable chain of mechanism which may include the drive gear 12.

It will be understood that the driven hub or drum 14 is fixedly connected to the platen shaft 30 to impart rotation thereto preferably through the retaining plate 18, so that the shaft and the driven drum 14 will rotate together, as will the remaining elements 16, 18 and 20 of the driven assembly, while the driving drum or hub 10 and its gear 12 will be freely rotatable about the shaft 30. The platen shaft is provided with the usual manual control knob 13 for manually positioning the platen. The mounting flange or disc 16 is fixed to the end of the driven drum 14 remote from the driving drum 10. At its other end the driven drum 14 is preferably formed with an integral sleeve-like extension 33 of reduced diameter, providing a bearing for rotatably supporting the cylindrical sleeve drum 10 of the driven clutch element. Such extension 32, while not absolutely essential, is desirable and important, as providing a means whereby the driving hub or drum 10 may be rotatably mounted on and assembled with the driven drum 14 with the two drums rotatably disposed in coaxial alignment to form a self-contained unit which may be assembled as such and subsequently applied to the platen shaft 30 or other driven shaft.

In accordance with usual practice the two drums 10 and 14 are of similar outer diameter. The helical clutch spring 22 is preferably of an internal normal diameter to frictionally engage both hubs. However, the arrangement and relationship of the several elements is such that this normal internal diameter of the spring coil 22 is not a critical dimension, and may be such that the spring will tend normally to be disengaged from both drums, if desired.

The means of anchoring the end 24 of the spring to the driven assembly and drum 14, is exemplified by the enlarged annular shoulder 34 formed with the notch 36 for reception of the axially directed end 24 of the spring. The other or free end 26 of the spring in the present embodiment projects radially outwardly, whereby it may be operatively connected to the primary control ring or element 28 by reception in the radially inwardly opening slot 38 in said element. Obviously the manner in which these connections are provided is not critical, and other expedients may be employed within the scope of the invention.

The primary control element 28 in the present embodiment is preferably supported from the driven assembly in a manner such that it may be brought to rest with the driven assembly without being influenced in any way by frictional drag exerted by the continuously rotating driving assembly 10, 12. To this end, the primary control element 28, in the form of an externally ratchet toothed annulus, is journalled about a cylindrical sleeve 40 which concentrically surrounds the clutch spring 22 and is fixedly coaxially secured at one end to a suitable part of the driven assembly, as exemplified by the rotary programming control element 20 thereof. This programming control element 20 is shown as comprising a bead chain sprocket and merely exemplifies in a broad sense one form which the said element may assume. However, this particular form of element finds special utility in contributing unobvious qualities of versatility and simplicity to the device, especially from the standpoint that it is associated in novel manner with a bead chain comprised predominantly of beads 54 of uniform comparatively small diameter, but with an occasional bead 56 of relatively larger diameter interposed therein at suitable points to function as a cam lobe on the sprocket wheel, to therewith provide a composite cam structure.

It will be seen that the supporting sleeve or bearing 40 for the ratchet wheel or annulus 28 is provided with a suitable cut-away area 42 of such circumferential extent as to permit the necessary degree of angular movement of the primary control element 28 on the sleeve 40.

The operation of the clutch structure as thus far described will be readily apparent. Angular movement of the primary control element 28 in the direction of drive, or in other words in a clockwise direction in FIGURE 2, tends to wind the spring 22 tighter about the drums 10 and 14, thereby causing it to frictionally engage them. Rotation of the driving drum 10 in opposition to the load of the driven assembly will tend to maintain and increase this frictional grip.

However, where the control element 28 is angularly displaced contra to the direction of drive, the diameter of the spring coil 22 is enlarged, thereby causing it to relinquish its frictional grip on the driving drum 10. Such relative angular displacement may be produced by a pawl 44 carried at the free end of the lever arm 46, the latter being supported for angular movement about a fixed fulcrum 48 in such manner that the pawl may be swung radially into and from operative engagement with the ratchet teeth 28'. The control lever also may include a sensing lever arm 50 terminating in a follower 52 at its free end for operative engagement with the beads 54 and 56, respectively, of the bead chain on sprocket 20.

Thus when the cam follower 52 is engaged with the smaller beads 54, the control lever, including both arms 50 and 46, will be so positioned that the pawl 44 is disengaged from the ratchet teeth 28' and, if desired, may be normally maintained in disengaged position by suitable spring means indicated diagrammatically at 55. When one of the larger beads 56 moves beneath the follower 52, it swings the control lever 46—50 to bring the pawl 44 into operative engagement with the ratchet teeth of primary control lement 28 to arrest the rotation of said element at a position which is accurately determined by the bead 56. By such arresting of the movement of control element 28, during its rotation with the driven assembly of the clutch, it is angularly displaced with respect to the driven assembly by virtue of the continuing rotary movement of the rotating driven assembly caused by the momentum thereof and the parts connected thereto. This continued rotary movement is in a direction to unwind and disengage the clutch spring 22 from the drums 10 and 14.

However, the recoiling action of the spring incident to such operation may obviously tend to reengage the clutch and/or cause it to chatter unless means are provided for positively maintaining the clutch spring disengaged until its reengagement is desired.

Accordingly the invention comprises in combination with the foregoing clutch structure a novel latch mechanism and controls therefor which are actuated incident to disengagement of the clutch to hold the parts disengaged and to permit retraction of the pawl 44 without danger of inadvertent reengagement.

The latch mechanism comprises a latch element in the form of the latch plate 18 (heretofore generally referred to), this being secured to the driven assembly for rotation therewith. This plate 18 is formed with a peripheral indentation 58 terminating at one end in a radially outwardly opening latching recess 60. A further latch element 62, normally disposed and operative within the recess 58, is provided with a latching detent 64 for cooperative latching reception in recess 60 and retraction therefrom. This latch 62 is pivotally mounted on the control element 28 by means of a rigid pivot pin 66 rigidly affixed to element 28 and projecting in an axially parallel direction through openings 68 and 70 in the sprocket 20 and mounting plate 16, respectively, these openings being of sufficient circumferential extent to permit at least the necessary degree of angular control movement of the primary control element 28 with respect to the driven assembly.

It will be seen that the circumferential extent of the indentation 58 in the latching element 18 is such as will permit angular movement of the latch 62, bodily with the primary control element 28, toward and away from its latching recess 60 to permit both winding and unwinding of the clutch spring 22. Also the latching recess 54 and the latch detent 64 are both so disposed that when brought into angular registry, and with the detent 64 moved into the recess 60, the primary control element 28 and the entire driven assembly are positively latched or locked against relative rotation. They are then maintained in relative angular positions such that the spring 22 is in its expanded position completely disengaged from the driving drum 10, thereby permitting the latter to rotate freely without imparting its rotation to the driven assembly.

For performing the dual functions of engaging and disengaging the latch mechanism and also of reengaging the driving and driven clutch assemblies, there is provided a secondary control element, exemplified by the externally ratchet toothed ring or annulus 72 supported on the driven assembly for relative angular movement with the primary control element 28 but, in addition, having a certain amount of lost motion with respect to the element 28. This lost motion is utilized for controlling the engagement and disengagement of the latch 62. The secondary control element or ring 72 is preferably rotatably journalled on a reduced diameter peripheral shoulder 74 of the latch plate 18 and is axially located between the plate flange 76 and the mounting plate 16 in a common radial plane with the pivoted latch element 62.

The preferred mode of interconnecting the secondary control element 72 with the latch element 62 is exemplified by the controlling lever arm 78 projecting radially from the latch with respect to its pivot. The free end of the arm is received in a notch 80 in the inner periphery of ring 72. With this arrangement, when the clutch is disengaged the ratchet ring 72 and latch element 62 will be angularly positioned with the latch detent 64 in registry with its cooperating recess 60. The secondary control element or ring 72 is then positioned to cooperate with the lever arm 78 in urging and maintaining the latch in positive latching engagement in said recess 60. The latch mechanism will thus maintain the clutch spring 22 in partially unwound and expanded condition so that it remains positively disengaged from the driving drum 10 and the driven assembly is accordingly at rest. If desired, for the purpose of balancing any tendency of the clutch spring coil 22 to contract about the drums, there may be provided a tension spring 82 interconnected in a generally tangential direction between the latch plate 18 and the control ring 72.

When it is desired to engage the clutch this may be readily accomplished by angular movement of the secondary control element or ring 72 in clockwise direction as seen in FIGURE 2. Such movement may be readily imparted to the control element 72 by means such as shown in FIGURE 6 consisting of a starting pawl 84, medially pivoted at 86 to the free end of a supporting arm 88 swingable about a stationary axis 90 on the frame F (FIGURE 1), which will normally be fixedly supported on the typewriter carriage. The pawl may be actuated through a rigid link 92 pivotally connected at 94 to the rear end of the pawl, and the link 92 may have operative thrust imparted thereto by suitable linkage connection to a typewriter key or other energizing source. Such operative thrust transmitted through the link 92 in the direction indicated by the arrow in FIGURE 6 will swing the operative end of the pawl 84 into operative engagement with one of the ratchet teeth of the secondary control element 72, and will maintain such engagement as the pawl 84 and its supporting arm 88 are both swung about the stationary axis 90 by continued thrust of the link 92. A suitable spring 96 may be utilized to retract supporting arm 88 to a position of rest against the stop 97 and the return movement of link 92 will retract the pawl 84 from operative engagement with ratchet element 72 until its stop 98 engages lever 88.

In the slightly modified arrangement shown in FIGURE 3, the arrangement is substantially the same as in FIGURES 1 and 6, except that the spring 96' is connected to the pivot 86 at the end of lever 88, and the shape of pawl 84' differs somewhat from the pawl 84 of FIGURE 3.

As the secondary control element 72 is thus angularly moved with respect to the then stationary driven assembly, it will act through the latch control arm 78, first to retract the pivoted latch 62 from the recess 60. During this period of retraction or unlatching there will be lost motion as between the primary and secondary control elements 28 and 72 caused by the swinging of the latch 62 about its pivot pin 66. However, when the latched detent 64 is fully retracted from recess 60 the retraction movement is arrested by abutment of the free end portion 65 of the latch against the inner periphery of the control ring 72 to terminate the lost motion. Then continued rotary movement of the control ring 72, together with the latch will be transmitted through the latch pivot 66 to the primary control element 28 to reduce the diameter of the spring 22 and thus engage it with the driving hub 10. This will result in initiating the rotation of the entire driven assembly together with both of its control elements 28 and 72. At this time both of the control elements 28 and 72 are completely free to rotate with the driven assembly and their rotational positions with respect to the driven assembly will remain unchanged until some exterior force is exerted upon them.

It will be noted that the secondary control element or ring 72 is of comparatively light construction and correspondingly low inertia so that when the movement of the latch plate 18 ceases, any forces acting on the latch through continued inertial tendency of ring 72 to rotate are relatively inconsequential and insufficient to retract it from the latching recess 60.

*Programmed Indexing Mechanism*

As was earlier mentioned, one of the important fields of utility of the clutch structure is an automatic line finder for a typewriter. By suitably actuating the starting ratchet or secondary control element 72, the movement of the constantly rotating driving drum 10 may be transmitted through the driven assembly to the shaft 30 of the typewriter platen, causing the platen to rotate and come to rest at any desired angular position, so that a sheet of paper or a form carried around with the platen may be positioned with any predetermined line adapted to receive typing.

It should be noted that important dual functions are served by virtue of mounting the pawl 44 on its respective lever arm 46 for resilient yielding movement with the primary control element or ratchet 28. In the illustrated embodiment such a mounting is achieved by forming the lever arm 46 with longitudinal slots 47 which slidably receive pins 49 fixed to the pawl 44. A tension spring 51 connected between the pawl 44 and the lever sensing arm 50 normally retracts the pawl toward the lever axis 48, but is yieldable to permit movement of the pawl in engagement with the ratchet teeth. This resilient yieldability of the pawl cushions the stopping action of the rotating driven parts, and at the same time permits them to rotate somewhat past the predetermined position of rotation in which it is desired to ultimately bring them to rest. However, the strength of the spring 51 is sufficient that it automatically returns the pawl 44 to its normal retracted position after absorbing the energy of the rotating part and, in so doing, brings the typewriter platen to rest in accurately predetermined position.

Furthermore, it will be seen that the degree of movement permitted the pawl 44, by virtue of its pin and slot connections 47—49, is such that the platen may be manually rotated in usual manner even though the pawl 44 is operatively engaged with the primary control element 28. As soon as the manual rotation has been carried out to the extent sufficient to remove one of the enlarged beads or cam lobes 56 from beneath the follower 52, this permits the spring 55 to retract the pawl automatically from the control element and thereafter avoid interference with continued manual rotation of the driven clutch assembly and typewriter platen.

In this application there are shown only the preferred embodiment of the invention, together with a minor modification of certain of its details. However, I recognize that my invention is capable of various further embodiments, and that its several details may be modified in various ways, all without departing from the invention as defined in the accompanying claims.

Having thus described my invention, I claim:

1. A spring clutch mechanism comprising driving and driven clutch assemblies, each including a friction drum, means rotatably supporting said assemblies with their drums in coaxial alignment, means constantly rotating said driving assembly, a helical clutch spring disposed coaxially around said aligned drums, one end of said spring being fixed to said driven assembly, a primary clutch spring control element carried by said driving assembly for rotation with the driven assembly and for angular movement relative to said driven assembly about the axis of said drums, the free end of said spring being connected to said primary control element for angular movement therewith to frictionally engage and disengage the spring from said driving drum, said driven clutch assembly including a first latch element fixed thereto and formed with a radially outwardly opening latching recess, in combination with a second latch element carried by said primary control element for operative movement into said latch recess when the said primary control element and driven clutch assembly are relatively angularly positioned to disengage the spring from said driving drum, a secondary control element carried by the driven clutch assembly for angular movement relative to said driven assembly about its rotational axis, said secondary control element being operatively connected to said second latch element to retract said second latch element from said recess responsive to angular movement of said secondary control element relative to said driven assembly.

2. A spring clutch mechanism comprising driving and driven clutch assemblies, each including a friction drum, means rotatably interconnecting said assemblies with their drums in coaxial alignment, means for imparting constant rotation to said driving assembly, a helical clutch spring disposed coaxially around said aligned drums, one end of said spring being fixed to said driven assembly, a primary clutch spring control element carried by said driving assembly for rotation with the driven assembly and for angular movement relative to said driven assembly about the axis of said drums, the free end of said spring being connected to said primary control element for angular movement therewith to frictionally engage and disengage the spring from said driving drum, said driven clutch assembly including a first latch element fixed thereto in combination with a second latch element carried by said primary control element for movement into operative engagement with said first latch element when the said primary control element and driven clutch assembly are relatively angularly positioned to disengage the spring from said driving drum, a secondary control element carried by the driven clutch assembly for rotation therewith and for angular movement relative to said driven assembly about its rotational axis, said secondary control element being operatively connected to said second latch element to disengage said second latch element from said first latch element responsive to angular movement of said secondary control element relative to said driven assembly.

3. A spring clutch mechanism comprising driving and driven clutch assemblies, each including a friction drum, means rotatably interconnecting said assemblies with their drums in coaxial alignment, means for transmitting constant rotation from a suitable power source to said driving assembly, a helical clutch spring disposed coaxially around said aligned drums, one end of said spring being fixed to said driven assembly, a primary clutch spring control element carried by said driving assembly for rotation with the driven assembly and for angular movement relative to said driven assembly about the axis of said drums, the free end of said spring being connected to said primary control element for angular movement therewith to frictionally engage and disengage the spring from said driving drum in combination with a latch element carried by said primary control element for operative movement into latching engagement with said driven assembly to secure said primary control element and driven assembly against relative angular movement when the said primary control element and driven clutch assembly are relatively angularly positioned to disengage the spring from said driving drum, a secondary control element carried by the driven clutch assembly for rotation therewith and for angular movement relative to said driven assembly about its rotational axis, said secondary control element being operatively connected to said latch element to disengage said latch element from said driven assembly responsive to angular movement of said secondary control element relative to said driven assembly.

4. A spring clutch mechanism comprising driving and driven friction drums, means interconnecting said drums for relative rotation in coaxial alignment, a helical clutch spring disposed coaxially around said aligned drums, one end of said spring being fixed to said driven drum, a primary clutch spring control element mounted for rotation with and for angular movement relative to said driven drum about the axis of said drums, the free end of said spring being connected to said primary control element for angular movement therewith to frictionally engage and disengage the spring from one of said drums, said driven drum including a first latch element fixed thereto in combination with a second latch element carried by said primary control element for operative movement into latching engagement with said first latching element to interconnect said primary control element and driven drum against relative angular movement when the said primary control element and driven drum are relatively angularly moved in a direction to partially unwind and disengage the spring from said one drum, a secondary control element connected to the driven drum for rotation therewith and for angular movement relative to said driven drum about its rotational axis, said secondary control element being operatively connected to said second latch element to disengage said second latch element from said first latch element responsive to angular movement of said secondary control element relative to said driven assembly in a direction opposite to said relative angular movement between said driven drum and the primary control element.

5. A spring clutch mechanism as defined in claim 4 including means operative after said disengagement of the second and first latch elements to interconnect the primary and secondary control elements for angular movement together.

6. A spring clutch mechanism comprising driving and driven clutch assemblies, each including a friction drum, means rotatably interconnecting said assemblies with their drums in coaxial alignment, a helical clutch spring disposed coaxially around said aligned drums, one end of said spring being fixed to said driven assembly, a primary clutch spring control element, means supporting said primary control element for rotation with said driven assembly and for angular movement relative to said driven assembly about the axis of said drums, the free end of said spring being connected to said primary control element for angular movement therewith to frictionally engage and disengage the spring from said driving drum, said driven clutch assembly including a first latch element fixed thereto in combination with a second latch element pivotally supported on said primary control element for operative radial pivotal movement into latching engagement with said first latch element when the said primary control element and driven clutch assembly are relatively angularly positioned to disengage the spring from said driving drum, a secondary control element carried by the driven clutch assembly for angular movement relative to said driven assembly about its rotational axis, said secondary control element having an operative pivotal connection to said second latch element eccentrically to the pivotal support of said second latch element and operative to engage or disengage said latch elements responsive to angular movement of said secondary control element relative to said driven assembly.

7. A spring clutch mechanism as defined in claim 6 in which said operative pivotal connection is operative following disengagement of the latch elements to transmit continued angular movement of the secondary control element through said second latch element to the primary control element.

8. A spring clutch element as defined in claim 6 in which both of said control elements are annular ratchets, including a stop pawl and means controlling same to selectively arrest said primary control element in any of various positions of rotation.

9. A spring clutch element as defined in claim 8 including a starting pawl, means supporting same for movement into and from operative engagement with the secondary control element and means for moving said starting pawl generally circumferentially to said secondary control element to angularly move the latter.

10. A spring clutch mechanism comprising driving and driven clutch assemblies, each including a friction drum, means rotatably supporting said assemblies with their drums in coaxial alignment, means constantly rotating said driving assembly, a helical clutch spring disposed coaxially around said aligned drums, one end of said spring being fixed to said driven assembly, a cylindrical sleeve fixed to said driven assembly coaxially around said spring, a primary clutch spring control element journalled on said sleeve for angular movement relative to said driven assembly about the axis of said drums, the free end of said spring being connected to said primary control element for angular movement therewith independently of any relative rotation between said assemblies to frictionally engage and disengage the spring from said driving drum in combination with a latch element carried by said primary control element for operative movement into latching engagement with said driven assembly to connect said primary control element and driven assembly for angular movement together when the said primary control element and driven clutch assembly are relatively angularly positioned to disengage the spring from said driving drum, a secondary control element carried by the driven clutch assembly for angular movement relative to said driven assembly about its rotational axis, said secondary control element being operatively connected to said second latch element to disengage said latch element responsive to angular movement of said secondary control element in said given direction relative to said driven assembly.

11. A spring clutch mechanism comprising driving and driven clutch assemblies, each including a friction drum, means rotatably supporting said assemblies with their drums in coaxial alignment, means constantly rotating said driving assembly, a helical clutch spring disposed coaxially around said aligned drums, one end of said spring being fixed to said driven assembly, a cylindrical sleeve fixed to said driven assembly coaxially around said spring, a primary clutch spring control element journalled on said sleeve for angular movement relative to said driven assembly about the axis of said drums, the free end of said spring being connected to said primary control element for angular movement therewith independently of any relative rotation between said assemblies to frictionally engage and disengage the spring from said driving drum.

12. A spring clutch mechanism comprising driving and driven clutch assemblies, each including a friction drum, means rotatably supporting said assemblies with their drums in coaxial alignment, a helical clutch spring disposed coaxially around said aligned drums, one end of said spring being fixed to said driven assembly, a primary clutch spring control element mounted for angular movement relative to said driven assembly about the axis of said drums, the free end of said spring being connected to said primary control element for angular movement therewith to frictionally engage and disengage the spring from said driving drum, and releasable latch means operative to interconnect said primary control element and said driven assembly in a relative angular position in which said spring is disengaged from the driving drum.

13. In a spring clutch comprising a driven assembly, including a driven drum, a driving drum coaxially aligned with said driven drum, said drums being disposed for relative rotation about their common axis, a spiral clutch spring coiled coaxially around said drums with one end of said spring anchored to said driven drum, primary and secondary control elements supported on said driven assembly for angular movement about said axis relative to the driven drum, the other end of said spring being connected to said primary control element for radial contraction and expansion of said spring responsive to angular movement of the primary control element, means interconnecting said primary and secondary control elements for angular movement together during contraction and expansion of said spring, said interconnecting means providing lost motion between the said control elements and permitting relative angular movement of the secondary element respective to the primary element both subsequent to expansion of the spring and prior to the contraction thereof, said interconnecting means including a latch element carried by said primary control element, and means operatively connecting said latch element to the secondary control element for movement into and from latching engagement with the driven assembly incident to said lost motion of the secondary control element.

14. In a spring clutch comprising a driven assembly, including a driven drum, a driving drum coaxially aligned with said driven drum, means interrelating said drums for relative rotation about their common axis, a spiral clutch spring coiled coaxially around said drums with one end of said spring anchored to said driven drum, primary and secondary control elements and means rotatably supporting said elements for angular movement about said axis relative to the driven drum, the other end of said spring being connected to said primary control element for radial expansion of said spring responsive to angular movement in a given direction of the primary control element, means interconnecting said primary and secondary control elements for angular movement during expansion of said spring, said interconnecting means providing lost motion between the said control elements and permitting relative angular movement of the secondary element in said given direction respective to the primary element subsequent to expansion of the spring, said interconnecting means including a latch element movably carried by said primary control element, and means operative connecting said latch element to the secondary control element for movement into latching engagement with the driven assembly incident to said lost motion.

15. In a spring clutch comprising a driven assembly, including a driven drum, a driving drum coaxially aligned with said driven drum, said drums being disposed for relative rotation about their common axis, a spiral clutch spring coiled coaxially around said drums with one end of said spring anchored to said driven drum, primary and secondary control elements and means rotatably supporting said elements for angular movement about said axis relative to the driven drum, the other end of said spring being connected to said primary control element for radial contraction of said spring responsive to angular movement of the primary control element in a given direction, means interconnecting said primary and secondary control elements for angular movement together during said expansion of said spring, said interconnecting means providing lost motion between the said control elements and permitting relative angular movement of the secondary element respective to the primary element subsequent to expansion of the spring, said interconnecting means including a latch element carried by said primary control element, and means operatively connecting said latch element to the secondary control element for movement into and from latching engagement with the driven assembly incident to said lost motion of the secondary control element.

16. In combination with a spring clutch mechanism, said mechanism comprising coaxially aligned driving and driven drums respectively mounted for rotation independently of each other about their common axis, a helical clutch spring operatively disposed about said drums to selectively interconnect them for rotation together, a ratchet toothed control wheel carried by said mechanism for rotation coaxially with and with respect to said drums, the opposite ends of said spring being connected respectively to said driven drum and said control element, a control cam connected to said driven drum for rotation therewith, means defining a radially projecting lobe on said cam, lever means having a fixed fulcrum adjacent the cam, said lever means including a sensing arm having a follower in operative engagement with said cam, a control arm extending adjacent said control wheel, and a pawl carried by said control arm for operative engagement with said ratchet wheel under the control of said cam and control arm to arrest the rotation of said wheel.

17. The combination defined in claim 16, wherein said pawl is mounted on said control arm for movement from a predetermined position with and generally in the direction of rotation of said wheel, and resilient means yieldingly opposing said movement and thereafter returning said pawl to its said predetermined position, thereby securing the accurate positioning of the wheel and its drum in their final position of rest.

18. The combination defined in claim 17 wherein said pawl is permitted a range of generally angular movement with the wheel in excess of the angular extent of said cam love, whereby the driven drum may be manually indexed independently of the aforesaid control cam and lever means, said manual indexing removing the lobe from beneath the said follower, and resilient means being provided for automatically disengaging the pawl from said wheel.

19. The combination defined in claim 16 wherein said control arm normally extends substantially tangentially to the ratchet wheel, the pawl being mounted on said control arm for sliding movement tangentially to the wheel, and said fulcrum supporting the control arm for swinging movement radially to the wheel to engage and disengage said pawl.

References Cited in the file of this patent
UNITED STATES PATENTS

| | | |
|---|---|---|
| 2,219,040 | Harper | Oct. 22, 1940 |
| 2,343,297 | Holcomb | Mar. 7, 1944 |
| 2,595,213 | Raynor | Apr. 29, 1952 |
| 2,734,604 | Soave | Feb. 14, 1956 |
| 2,883,022 | Clausing et al. | Apr. 21, 1959 |
| 2,975,648 | Doerries | Mar. 21, 1961 |
| 3,005,355 | Mason | Oct. 24, 1961 |
| 3,021,512 | Welsh et al. | Feb. 13, 1962 |